United States Patent [19]

Kasai et al.

[11] Patent Number: 5,720,787
[45] Date of Patent: Feb. 24, 1998

[54] EXHAUST GAS PURIFYING FILTER USING HONEYCOMB MONOLITH WITH RANDOM LENGTH SEALING PORTIONS

[75] Inventors: Yoshiyuki Kasai; Yoshiro Ono; Toshio Yamada, all of Nagoya, Japan

[73] Assignee: NGK Insulators, Ltd., Japan

[21] Appl. No.: 629,036

[22] Filed: Apr. 8, 1996

[30] Foreign Application Priority Data

Apr. 12, 1995 [JP] Japan ..................... 7-086728

[51] Int. Cl.⁶ ..................... B01D 41/04; B01D 41/00
[52] U.S. Cl. ..................... 55/282; 55/523; 55/466; 55/DIG. 30; 55/DIG. 10
[58] Field of Search ..................... 55/DIG. 30, 523, 55/466, 282, 284, DIG. 10; 95/243; 60/303, 320

[56] References Cited

U.S. PATENT DOCUMENTS

| 4,389,364 | 6/1983 | Endo et al. ..................... 264/167 |
| 4,519,820 | 5/1985 | Oyobe et al. ..................... 55/284 |
| 4,568,402 | 2/1986 | Ogawa et al. . |
| 4,606,879 | 8/1986 | Cerisano ..................... 264/565 |
| 5,114,581 | 5/1992 | Goldsmith et al. ..................... 210/650 |
| 5,211,012 | 5/1993 | Swars ..................... 55/481 |
| 5,290,457 | 3/1994 | Karbachsch et al. ..................... 210/792 |

FOREIGN PATENT DOCUMENTS

| 3444472 | 2/1986 | Germany . |
| 61-10917 | 1/1986 | Japan . |
| 61-138812 | 6/1986 | Japan . |
| 2-63020 | 5/1990 | Japan . |

Primary Examiner—Jay H. Woo
Assistant Examiner—Robert Hopkins
Attorney, Agent, or Firm—Parkhurst, Wendel & Burr, L.L.P.

[57] ABSTRACT

An exhaust gas purifying filter for removing carbon particles from combustion exhaust gas, having a honeycomb structural body, flow passages that are sealed alternately at both ends by means of sealing portions to form checkerboard patterns. In the exhaust gas purifying filter according to the invention, lengths of the sealing portions formed in the flow passages of the honeycomb structural body vary randomly. An exhaust gas purifying apparatus utilizing the exhaust gas purifying filter according to the invention is also disclosed.

8 Claims, 4 Drawing Sheets

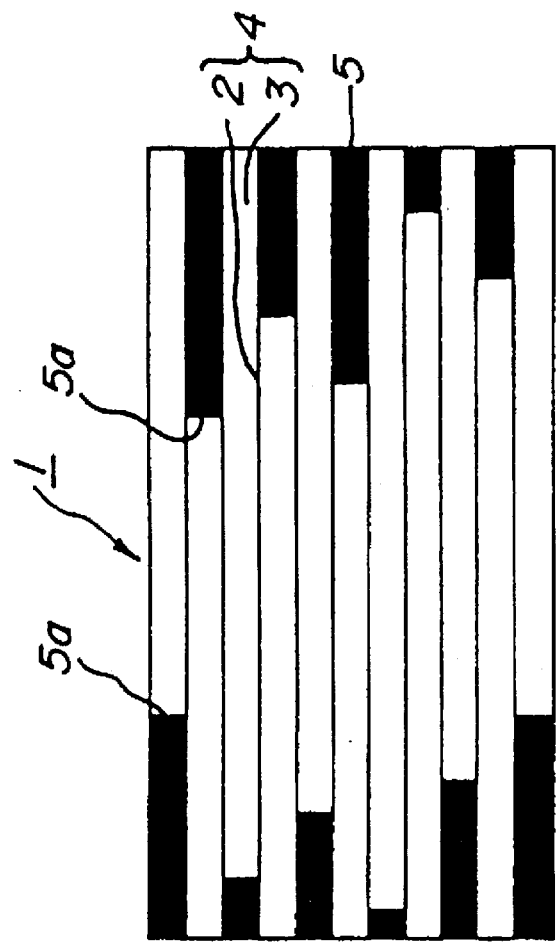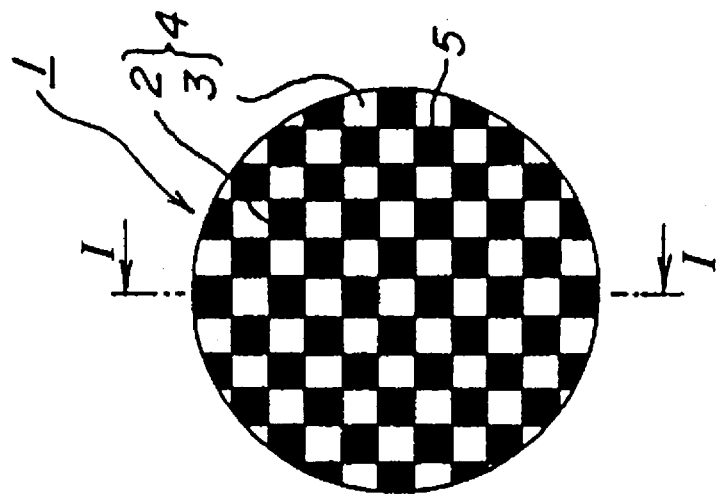

FIG_2
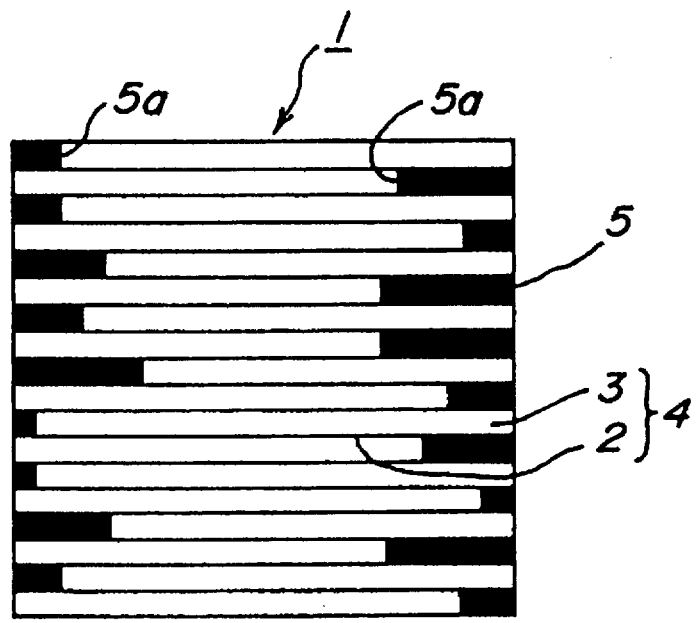
FIG_3
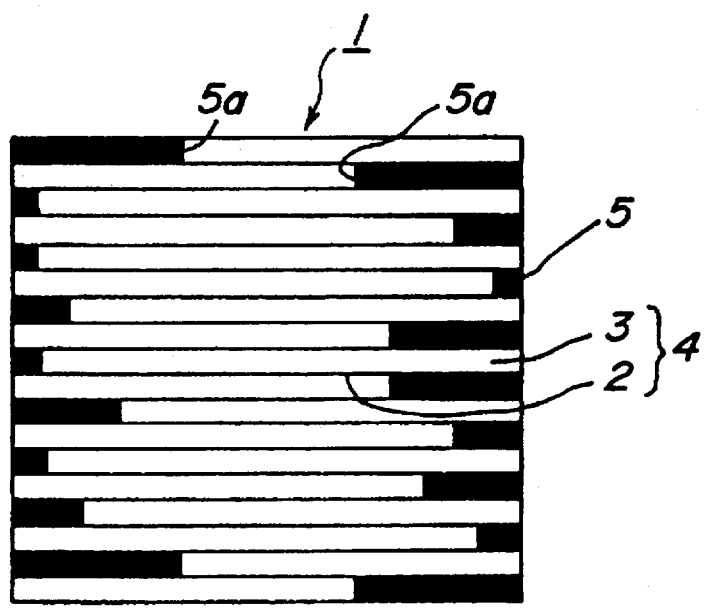

EXHAUST GAS PURIFYING FILTER USING HONEYCOMB MONOLITH WITH RANDOM LENGTH SEALING PORTIONS

BACKGROUND OF THE INVENTION

1. Field of the Invention

The present invention relates to an exhaust gas purifying filter for removing solid particles made of carbon as a main ingredient from a combustion exhaust gas discharged from a diesel engine or the like and an exhaust gas purifying apparatus utilizing the exhaust gas purifying filter mentioned above.

2. Prior Art Statement

Generally, in order to remove solid particles made of carbon as a main ingredient from the combustion exhaust gas discharged from a diesel engine or the like, use is made of an exhaust gas purifying filter having a honeycomb structural body in which flow passages are sealed alternately at both ends by means of sealing portions like a checkerboard pattern. In this case, one end of the flow passage is sealed at an upstream side or at a downstream side.

The honeycomb structural filter generally made of cordierite, is subjected to thermal expansion in an anisotropic manner even if the sealing portion is made of the same cordierite material. Therefore, in order to make a thermal expansion of a filter portion lower along a flow passage direction, cordierite crystals are oriented in such a manner that a direction along which the cordierite crystal shows a smallest thermal expansion coefficient is aligned parallel to the flow passage direction. On the other hand, in the sealing portion, it is not possible to control the cordierite crystals in the manner mentioned above. Therefore, a thermal expansion of the sealing portion is not the same as that of the filter portion. Moreover, even if the filter portion is made of another material such as alumina and silicon nitride which shows an isotropic thermal expansion, the thermal expansion of the sealing portion is not the same as that of the filter portion. In this case, since a thickness of the sealing portion is larger than that of the filter portion, a strength of the sealing portion is larger then that of the filter portion. Therefore, if a thermal shock is applied to the filter portion, a stress is concentrated at a boundary between the sealing portion and the filter portion, and thus a crack is liable to be generated at the boundary. In an extreme case, the sealing portion is separated from the filter portion.

In the known technique in which thicknesses of the sealing portions are the same and thus inner ends of the sealing portions in the filter are aligned linearly (shown in FIG. 5), or in the known technique in which the thicknesses of the sealing portions in the filter are made gradually thicker from an outer peripheral portion to a center portion such that inner ends of the sealing portions are aligned in a gradually inclined manner as disclosed in Japanese Utility-Model Laid-Open Publication No. 2-63020 or Japanese Utility-Model Laid-Open Publication No. 61-10917 (shown in FIG. 6), it is possible to prevent a filter fusing due to a self-ignition of the trapped soots in the filter. However, a stress is liable to be concentrated along a line constructed by the inner ends of the sealing portions, since the inner ends of the sealing portions construct a simple pattern. Therefore, also in the techniques mentioned above, it is not possible to prevent a crack generation.

Moreover, in Japanese Patent Laid-Open Publication No. 61-138812, there is disclosed a technique that the ends of the adjacent sealing portions are arranged at different positions in a downstream side of the filter. In this method, since the soot is liable to be trapped at the end of the sealing portion, heating positions can be varied when the soot is burnt. Therefore, it is possible to prevent the filter fusing at the downstream side of the filter. However, if a regeneration of the filter is performed by using a burner, an electric heater and so on arranged at an upstream side i.e, an inlet side of the filter, a thermal shock is applied to the filter. That is to say, since a flame of the burner or the Heater is directly brought into contact with the inlet end of the filter, the thermal shock is generated when the regeneration of the filter is performed. Therefore, in this method, it is not possible to prevent a crack generation due to the thermal shock at the inlet side of the filter.

SUMMARY OF THE INVENTION

An object of the invention is to eliminate the drawbacks mentioned above and to provide an exhaust gas purifying filter in which a crack generation at a boundary between a wall portion of the filter and a sealing portion can be prevented and also a filter fusing due to the crack generation can be prevented, and an exhaust gas purifying apparatus utilizing the exhaust gas purifying filter.

According to the invention, an exhaust gas purifying filter for removing solid particles made of carbon as a main ingredient from a combustion exhaust gas, having a honeycomb structural body, flow passages that are sealed alternately at both ends by means of sealing portions that form checkerboard pattern, comprises a construction such that thicknesses of the sealing portions formed in the flow passages of the honeycomb structural body vary randomly.

Moreover, according to the invention, an exhaust gas purifying apparatus comprises an exhaust gas purifying filter having the construction mentioned above, and a can member in which said exhaust gas purifying filter is fixed.

In the construction mentioned above, since the thicknesses of the sealing portions are substantially different at random, boundaries between the sealing portions and the wall portions do not extend linearly or along a predetermined pattern. Therefore, portions to which a stress due to the thermal shock is concentrated and portions to which a burning heat is concentrated are not contiguous, and thus the stress and the burning heat can be dispersed. As a result, a crack generation due to the thermal shock (both at an upstream side and a downstream side) and a filter fusing (mainly at a downstream side) can be prevented. Moreover, if the exhaust gas purifying apparatus is constructed by utilizing the exhaust gas purifying filter mentioned above, it is possible to construct the exhaust gas purifying apparatus having an excellent thermal shock resistivity.

The thickness itself of the sealing portion is not limited, but it is preferred to set the thickness of the sealing portion to larger than 3 mm, since the sealing portion is not separated from the filter and a sufficient reliability can be achieved. Moreover, it is preferred to set the sealing portion at an outer peripheral portion of the filter to larger than 10 mm. This is because the sealing portion at the outer peripheral portion of the filter needs a sufficient mechanical strength since the filter is fixed by arranging a retainer to the outer peripheral portion of the filter so as to prevent a filter deviation and a seal leak. Further, it is preferred to set the thickness of the sealing portion to smaller than ⅓ of a filter length. This is because, if the thickness of the sealing portion is not set to smaller than ⅓ of the filter length, an effective area of the filter becomes smaller, and thus the filter having an excellent filter property can not be obtained while it has an excellent thermal shock resistivity.

Moreover, the exhaust gas purifying apparatus utilizing the exhaust gas purifying filter having a construction mentioned above has an excellent thermal shock resistance and an excellent sealing property. Therefore, it is possible to obtain the exhaust gas purifying apparatus showing an excellent filter property regardless of the filter regeneration method utilized, including regeneration by utilizing a reverse air flow and regeneration by applying heat.

BRIEF DESCRIPTION OF THE DRAWINGS

FIG. 1a is an end view showing one embodiment of an exhaust gas purifying filter according to the invention.

FIG. 1b is a cross section view taken along line I—I of FIG. 1a.

FIG. 2 is a schematic view illustrating another embodiment of the exhaust gas purifying filter according to the invention;

FIG. 3 is a schematic view depicting still another embodiment of the exhaust gas purifying filter according to the invention;

DESCRIPTION OF THE PREFERRED EMBODIMENT

Figure 4:
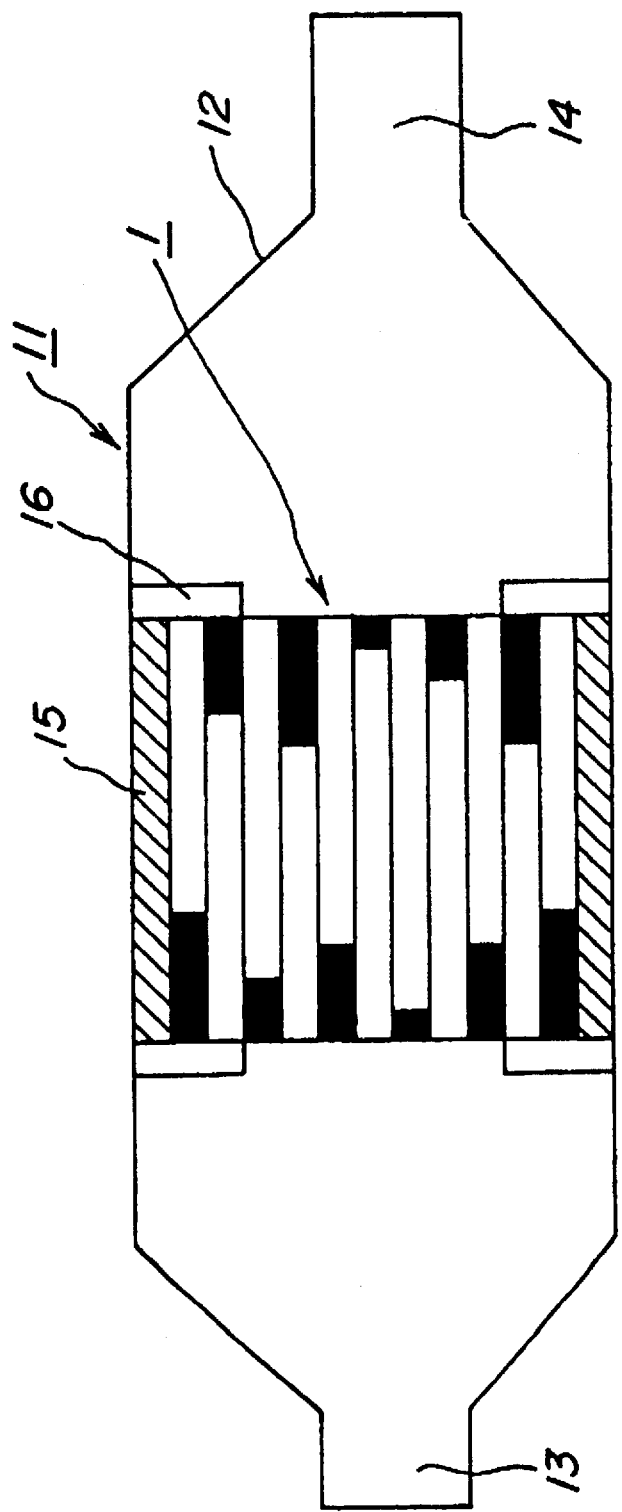
FIG. 4 is a schematic view showing one embodiment of an exhaust gas purifying apparatus utilizing the exhaust gas purifying filter according to the invention.
Figure 5:
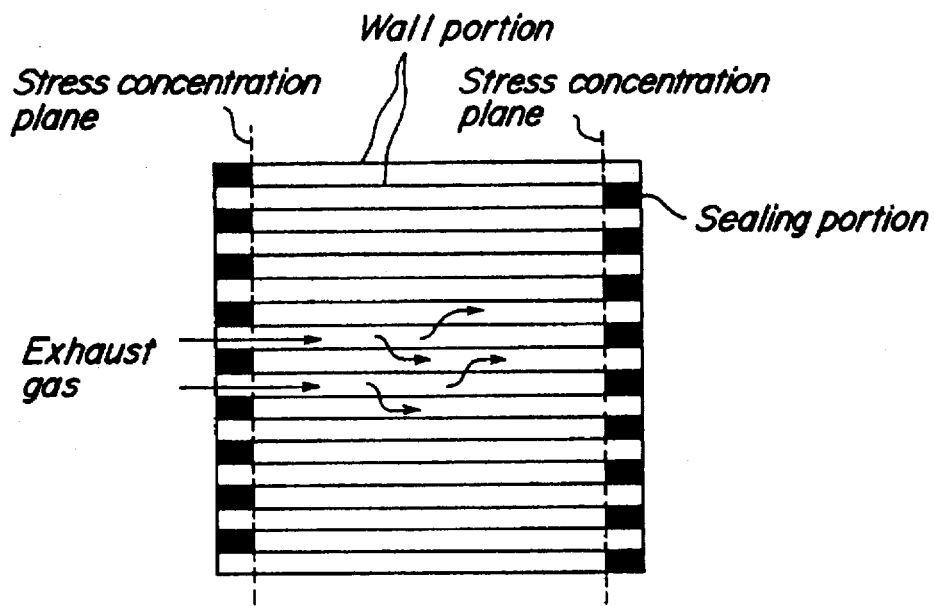
FIG. 5 is a schematic view illustrating one embodiment of a known exhaust gas purifying filter.
Figure 6:
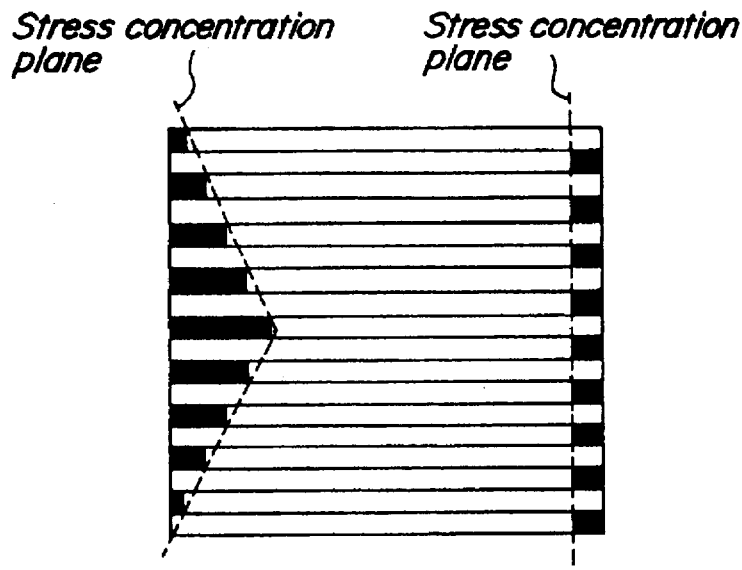
FIG. 6 is a schematic view depicting another embodiment of the known exhaust gas purifying filter.

FIG. 1 is a schematic view showing one embodiment of an exhaust gas purifying filter according to the invention. In this case, FIG. 1a shows an end portion of the filter, and FIG. 1b illustrates a cross section cut along an I—I line in FIG. 1a. In FIG. 1, an exhaust gas purifying filter 1 is constructed by a ceramic honeycomb structural body 4 having through-holes 3 defined by a plurality of wall portions 2. The through-hole 3 constructs a flow passage. The through-holes 3 are plugged alternately by a sealing portion 5 at an upstream end and a downstream end of the ceramic honeycomb structural body 4. That is to say, as shown in FIG. 1a, the sealing portions 5 seal the through-holes 3 in a checkerboard pattern at both upstream and downstream ends, and a respective through-hole 3 has the sealing portion 5 at one of the upstream or downstream ends.

In this embodiment, an important feature is that thicknesses of the sealing portions 5 sealing the through-holes 3 in the filter 1 are substantially different at random. Here, a term "substantially different at random" means that the thicknesses of the sealing portions 5 are uneven, i.e. one is thick and the other is thin. In this case, as shown in FIGS. 2 and 3, the term includes the case such that the thickness of one sealing portion 5 is the same as that of the adjacent sealing portion 5 partly and thus the thicknesses are substantially different at random. Moreover, it is preferred that the thicknesses of the sealing portions satisfy a dispersion coefficient $\overline{X}/\sigma_{n-1}$ of smaller than 35. The dispersion coefficient shows a variation rate of the thicknesses of the sealing portions with respect to a mean thickness thereof. If the dispersion coefficient becomes smaller, the variation of the thicknesses becomes larger. In this case, if the dispersion coefficient is smaller than 35, stress is dispersed (i.e., not concentrated). Therefore, it is possible to prevent a crack generation due to a thermal shock.

As a ceramic material for the ceramic honeycomb structural body 4, it is preferred to use a material having heat resistance since the filter according to the invention is used for an exhaust gas having a high temperature discharged from a diesel engine or the like. Therefore, it is preferred to use a ceramic material having one main crystal phase selected from a group of cordierite, mullite, alumina, silicon nitride, silicon carbide and LAS (Lithium-Aluminum-Silicate). Among them, it is most preferred to use cordierite as a main crystal phase for the ceramic honeycomb structural body 4, since cordierite is not expensive and has an excellent heat resistance and an excellent chemical resistance such as a corrosion resistance.

Moreover, it is preferred that the thickness of the sealing portion 5 in the through-hole 3 is set to larger than 3 mm at the most thin portion and to larger than 10 mm at the outer peripheral portion. Further, it is preferred that an upper limit of the thickness of the sealing portion is set to smaller than ⅓ of a length L of the filter i.e. the ceramic honeycomb structural body 4. In addition, it is preferred that the thickness of the outer peripheral portion is set to 40 mm which is the most thick portion and the thickness of the inner portion is set to 15 mm–40 mm. In this case, the outer peripheral portion and the inner portion are relatively related on the end of the ceramic honeycomb structural body 4 shown in FIG. 1a. Therefore, for example, it is possible to define the inner portion as a circular area having a diameter of smaller than ¾ of the diameter at the end of the ceramic honeycomb structural body 4 and the outer peripheral portion is an area outside the circular area mentioned above.

Furthermore, ceramic honeycomb structural body 4 and sealing portion 5 may be made by known methods. For example, the sealing portion 5 can be formed by drying an extruded ceramic honeycomb structural body 4, filling a ceramic paste made of the same material as that of the ceramic honeycomb structural body 4 in the through-holes 3 with a predetermined thickness, and firing the ceramic honeycomb structural body.

In the exhaust gas purifying filter 1 having the construction mentioned above, a combustion exhaust gas including solid particles made of carbon as a main ingredient discharged from for example a diesel engine is supplied into the exhaust gas purifying filter 1 from the through-holes 3 opened at an upstream side and is passed through the wall portion 2, and the exhaust gas passed through the wall portion 2 is discharged into the air from the through-holes 3 opened at a downstream side. Therefore, the solid particles made of carbon as a main ingredient in the exhaust gas can be trapped by the wall portion 2.

Generally, when regeneration is performed or self-ignition occurs, the filter reaches a temperature of about 1000° C., and a thermal shock when the engine starts is higher than 700° C. However, in the exhaust gas purifying filter 1 according to the invention, a burning heat and a stress concentration portion do not extend linearly along the boundary between the ends 5a of the sealing portions 5 and the wall portions 2, and thus it is possible to prevent the crack generation and the filter fusing at the boundary.

FIG. 4 is a schematic view showing one embodiment of an exhaust gas purifying apparatus according to the invention utilising the exhaust gas purifying filter mentioned above. In the embodiment shown in FIG. 4, an exhaust gas purifying apparatus 11 is constructed in such a manner that the exhaust gas purifying filter 1 having the construction shown in, for example, FIG. 1 is fixed in a can member 12 made of a metal. The can member 12 has an exhaust gas inlet 13 and an exhaust gas outlet 14 both having a cone cup shape at its both ends. Moreover, the fixing of the exhaust gas purifying filter 1 with respect to the can member 12 is performed in such a manner that the exhaust gas purifying filter 1 is fixed to an inner surface of the can member 12 via ceramic mat 15, and an outer peripheral portion of the exhaust gas purifying filter 1 is supported by a retainer 16.

As shown in FIG. 4, in the case of using the retainer 16, it is preferred to set the thickness of the sealing portion 5 of the honeycomb structural body 4 which is covered with the retainer 16 to larger then 10 mm. This is because the thick sealing portion 5 functions to prevent a fracture or the like of the honeycomb structural body 4 due to the use of the retainer 16. Moreover, the thicknesses of the sealing portions 5 are set to be substantially uneven at the both ends of the honeycomb structural body 4. Therefore, it is possible to prevent crack generation both at the upstream side and the down stream side and also to prevent filter fusing at the upstream side due to a burning flame when the regeneration is performed or due to heat from an electric heater.

Hereinafter, an actual embodiment will be explained.

Experiment

Raw materials for cordierite generation having a cordierite theoretical composition were mixed and extruded to obtain a honeycomb formed body. The thus obtained honeycomb formed body was fired at 1400° C. to obtain a cordierite honeycomb structural body. Then, sealing portions were formed at both ends of the cordierite honeycomb structural body in such a manner that a dispersion coefficient of thicknesses of the sealing portions was varied according to the following Table 1 to obtain a filter having a honeycomb construction. The filter had a diameter of 120 mm, a thickness was 150 mm, a cell density was 15.5 cell/cm$^2$ and a wall thickness was 430 μm.

With respect to the thus obtained filter, a thermal shock resistance was measured. The thermal shock resistance was estimated by an endured thermal shock temperature. In this case, the filter was maintained in an electric furnace having a predetermined constant temperature for 30 min. and then cooled down rapidly to a room temperature, thereby a temperature at which a crack was detected by the naked eye was estimated as the endured thermal shock temperature. Further, when the crack was not detected by the naked eye, a temperature of the electric furnace was increased by 25° C., and the same measurement mentioned above was repeated till the crack was detected by the naked eye. In this case, the number of measured samples was three, and the results were shown by a mean value. The results are shown in Table 1 below.

TABLE 1

| Sample | Thickness of sealing portion | | | Endured thermal shock temperature (°C.) |
|---|---|---|---|---|
| | Mean thickness (mm) | Standard deviation | Dispersion coefficient | |
| T-1 | 5.0 | 0.125 | 40 | 692 |
| T-2 | 5.0 | 0.132 | 38 | 708 |
| T-3 | 5.0 | 0.143 | 35 | 750 |
| T-4 | 5.0 | 0.172 | 29 | 767 |
| T-5 | 30.0 | 0.732 | 41 | 683 |
| T-6 | 30.0 | 0.811 | 37 | 692 |
| T-7 | 30.0 | 0.857 | 35 | 758 |
| T-8 | 30.0 | 1.000 | 30 | 792 |
| T-9 | 30.0 | 2.143 | 14 | 800 |

If the endured thermal shock temperature is larger than 750° C., the thermal shock resistance when the regeneration is performed is sufficient. From the results shown in Table 1, it is understood that, if the dispersion coefficient is not smaller than 35, the endured thermal shock temperature is not larger than 750° C., so that a sufficient thermal shock resistance when performing the regeneration is not obtained. In this case, the crack due to the thermal shock is liable to be generated. On the contrary, it is understood that, if the dispersion coefficient is smaller than 35, sufficient thermal shock resistance can be obtained. Therefore, in this case, no crack is generated during actual use.

As clearly understood from the above explanations, according to the invention, since the thickness of the sealing portion are substantially different at random, boundaries between the sealing portions and the wall portions do not extend linearly or along a predetermined pattern. Therefore, portions to which a stress due to the thermal shock is concentrated and portions to which a burning heat is concentrated are not contiguous, and thus the stress and the burning heat can be dispersed. As a result, a crack generation due to the thermal shock (both at an upstream side and a downstream side) and a filter fusing (mainly at a downstream side) can be prevented. Moreover, if the exhaust gas purifying apparatus is constructed by utilizing the exhaust gas purifying filter mentioned above, it is possible to construct the exhaust gas purifying apparatus having an excellent thermal shock resistivity.

What is claimed is:

1. An exhaust gas purifying filter for removing carbon containing solid particles from a combustion exhaust gas, comprising:

a honeycomb structural body having first and second opposite axial ends and defining flow passages extending between the ends, said flow passages being sealed alternately at both ends by means of sealing portions to form checkerboard patterns, wherein the axial lengths of the sealing portions formed in the flow passages of the honeycomb structural body vary randomly in a non-stepwise manner, wherein an imaginary line interconnecting the ends of the sealing portions along at least one of the first and second opposite axial ends of the honeycomb structural body is non-linear.

2. The exhaust gas purifying filter according to claim 1, wherein the lengths of said sealing portions are larger than 3 mm and smaller than ⅓ of the length of the filter.

3. The exhaust gas purifying filter according to claim 1, wherein a sealing portion provided along a radial peripheral portion of the honeycomb structural body has the largest axial length of said sealing portions.

4. The exhaust gas purifying filter according to claim 1, wherein said honeycomb structural body has a main crystal phase selected from the group consisting of cordierite, mullite, alumina, silicon nitride, silicon carbide and LAS.

5. The exhaust gas purifying filter according to claim 1, wherein a dispersion coefficient $X/\delta_{n-1}$ of the axial lengths of the sealing portions is smaller than 35, wherein X is the mean axial length of the sealing portions and $\delta_{n-1}$ is the standard deviation of the axial lengths of the sealing portions.

6. An exhaust gas purifying apparatus comprising an exhaust gas purifying filter having the construction according to claim 1, and a can member in which said exhaust gas purifying filter is fixed.

7. The exhaust gas purifying apparatus according to claim 6, further comprising a retainer for supporting said honeycomb structural body in said can member.

8. The exhaust gas purifying apparatus according to claim 6, further comprising regeneration means for regenerating said exhaust gas purifying filter by burning solid particles of carbon trapped by said filter.

* * * * *